United States Patent
Silver et al.

(10) Patent No.: US 7,433,458 B2
(45) Date of Patent: Oct. 7, 2008

(54) SYSTEM AND METHOD FOR VIEWING CONTENTS VIA A COMPUTER NETWORK DURING A TELEPHONE CALL

(75) Inventors: Edward Michael Silver, Atlanta, GA (US); Linda Ann Roberts, Decatur, GA (US); Hong Thi Nguyen, Atlanta, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 773 days.

(21) Appl. No.: 09/893,910

(22) Filed: Jun. 29, 2001

(65) Prior Publication Data

US 2004/0213207 A1    Oct. 28, 2004

(51) Int. Cl.
*H04M 3/00* (2006.01)

(52) U.S. Cl. .......................... 379/265.09; 379/221.08; 379/221.09; 379/221.11; 379/221.12

(58) Field of Classification Search ............ 379/265.09, 379/221.08, 221.09, 221.11, 221.12
See application file for complete search history.

(56) References Cited

U.S. PATENT DOCUMENTS

| | | | | |
|---|---|---|---|---|
| 4,736,407 A | 4/1988 | Dumas | ..................... | 379/93.21 |
| 4,796,293 A | 1/1989 | Blinken et al. | ......... | 379/202.01 |
| 5,365,577 A * | 11/1994 | Davis et al. | .............. | 379/93.17 |
| 5,530,472 A | 6/1996 | Bregman et al. | ......... | 348/14.04 |
| 5,537,548 A | 7/1996 | Fin | ............................ | 709/204 |
| 5,659,692 A | 8/1997 | Poggio | ....................... | 715/756 |
| 5,701,301 A | 12/1997 | Weisser, Jr. | ................. | 370/428 |
| 5,784,561 A | 7/1998 | Bruno et al. | ................ | 709/204 |
| 5,822,525 A | 10/1998 | Tafoya | ........................ | 709/204 |
| 5,838,774 A | 11/1998 | Weisser, Jr. | ............... | 379/92.02 |
| 5,854,893 A | 12/1998 | Ludwig | ....................... | 709/204 |
| 5,884,032 A * | 3/1999 | Bateman et al. | ............. | 709/204 |
| 5,978,463 A | 11/1999 | Jurkevics et al. | ....... | 379/202.01 |
| 5,978,806 A * | 11/1999 | Lund | ........................... | 707/10 |
| 5,995,608 A | 11/1999 | Detampel, Jr. et al. | . | 379/205.01 |
| 5,999,986 A | 12/1999 | McDougall et al. | ......... | 709/204 |
| 6,049,602 A * | 4/2000 | Foladare et al. | ........ | 379/265.04 |
| 6,064,730 A * | 5/2000 | Ginsberg | ............... | 379/265.09 |
| 6,148,068 A | 11/2000 | Lowery | ................. | 379/202.01 |
| 6,181,786 B1 | 1/2001 | Detampel, Jr. et al. | . | 379/205.01 |
| 6,233,605 B1 | 5/2001 | Watson | ....................... | 709/204 |
| 6,295,551 B1 | 9/2001 | Roberts et al. | | |
| 6,446,113 B1 | 9/2002 | Ozzie | ......................... | 709/204 |
| 6,560,637 B1 | 5/2003 | Dunlap | ....................... | 709/204 |
| 6,714,635 B1 | 3/2004 | Adams et al. | ........... | 379/204.01 |
| 6,791,974 B1 * | 9/2004 | Greenberg | ................... | 370/352 |
| 2002/0188678 A1 | 12/2002 | Edecker | ....................... | 709/204 |
| 2003/0093476 A1 | 5/2003 | Syed | .......................... | 709/204 |

\* cited by examiner

*Primary Examiner*—Quynh H Nguyen
(74) *Attorney, Agent, or Firm*—Scott P. Zimmerman, PLLC

(57) ABSTRACT

A method for enabling one or both parties of a telephone call to view contents of a source computer via a computer network during the telephone call. The method includes the following steps: (1) associating a telephone number of a telephone line with a network address of the source computer; (2) retrieving the network address when a call is received by or placed on the telephone line; and (3) establishing a data session between the source computer and one or more display devices associated with the telephone line during which contents of the source computer are displayed on the display devices.

15 Claims, 8 Drawing Sheets

SYSTEM AND METHOD FOR VIEWING CONTENTS VIA A COMPUTER NETWORK DURING A TELEPHONE CALL

BACKGROUND

1. Field of the Invention

The present invention relates to telecommunications, and more particularly, to a system and method for enabling one or both parties of a telephone call to view contents of a source computer via a computer network during the telephone call.

2. Background of the Invention

Currently, when a calling party and a called party are engaged in a telephone conversation, the communication between them is limited to the exchange of their voices. Exchange of video images may take place if each of them has a video telephone set that is equipped with a camera and a display device. Most users have not found such video telephone sets useful, however. For example, many users find the video quality to be poor or unacceptable. As a result, video telephone sets have been underutilized.

In fact, the entire telephone system is underutilized when one party of a telephone call puts the other party on hold. It is common for a calling party (e.g., a customer of a business entity) to stay on hold for an extended period of time when a called party (e.g., a customer service representative of the business entity) is handling a large number of calls. As the calling party stays on hold, valuable time of the calling party and scarce telecommunication resources of the telephone network are being wasted. Some businesses provide music or special announcements to calling parties who are on hold. Such systems, however, are not visually presented and are not generally interactive.

The difficulties associated with effective utilization of computer-telephone technology is discussed in "An Introduction to Computer Telephony," authorized by Carl R. Strathmeyer, and published in IEEE Communications Magazine, May 1996. This article is incorporated herein by reference in its entirety.

Accordingly, there is a need for a system and method that will more fully utilize the telephone network and allow users to better utilize their time. Specifically, there is a need for a system and method that enables one or both parties of a telephone call to view contents of a source computer via a computer network during the telephone call.

SUMMARY OF THE INVENTION

The present invention is a system and method that enables one or both parties to a telephone call to view contents of a source computer via a computer network during the telephone call. In one aspect of the present invention, the contents of the source computer that comprises, for example, web pages in the Hypertext Markup Language (HTML) format, may be displayed on one or more display devices of the parties over the Internet.

In one embodiment, a called party can view contents stored in a source computer maintained by a calling party who initiated the telephone call. In another embodiment, the calling party can view contents stored in another source computer maintained by the called party. In still another embodiment, both calling and called parties can concurrently view contents of a common source computer.

In an embodiment in which a called party is a subscriber of a service of the present invention, the called party can view contents of a source computer associated with, maintained by, or otherwise designated by the calling party. In this embodiment, the telephone number of the calling party can be obtained and used by the called party to look up a network address of the source computer. Using the network address, the source computer of the calling party can be contacted and its contents can be displayed on a display device at the called party's location. The display device may be an integral part of the called party's telephone set that is being used to receive the telephone call. The display device may also be a component of a target computer of the called party which is in communication with the telephone set. For a residential calling party, contents of the source computer may contain, for example, the family coat of arms, recent pictures of the children, or other information designated by the calling party. For a business calling party, the contents may include, for example, an organizational chart and a catalog of products or other information.

In another embodiment in which a calling party is a subscriber of a service of the present invention, the calling party can view contents of a source computer whenever he or she uses the telephone. The source computer may be, for example, a server computer of the calling party's favorite web site. For example, whenever the calling party makes a telephone call, the dialed digits are collected to retrieve a network address of the source computer. Once a data communication session is established, the contents of the source computer are displayed on a display device. This allows the calling party to view his or her favorite web page while waiting for or engaged in a voice communication session with a called party. Alternatively, the source computer may be associated with, maintained by, or otherwise designated by the called party.

In still another embodiment, each of the calling and the called parties can view the same contents of a common source computer on separate display devices while they engage in a voice conversation on their telephone sets.

A method for using the present invention comprises the following steps. First, one or more relationships between telephone numbers and network addresses of source computers are stored in a database accessible by a subscriber's equipment. The equipment may be a telephone set that is in communication with a computer system. Alternatively, the equipment may be a telephone set with video and modem capabilities. An application software is installed on the equipment. Second, when a call is received from a calling party, a telephone number of the calling party is obtained. Third, the network address associated with the telephone number of the calling party is retrieved from the database. Fourth, a data communication session is established between a display device of the called party and a source computer associated with the network address is established. Fifth, contents of the source computer are rendered on the display device of the called party during the data communication session.

DETAILED DESCRIPTION OF PREFERRED EMBODIMENTS

Figure 1:
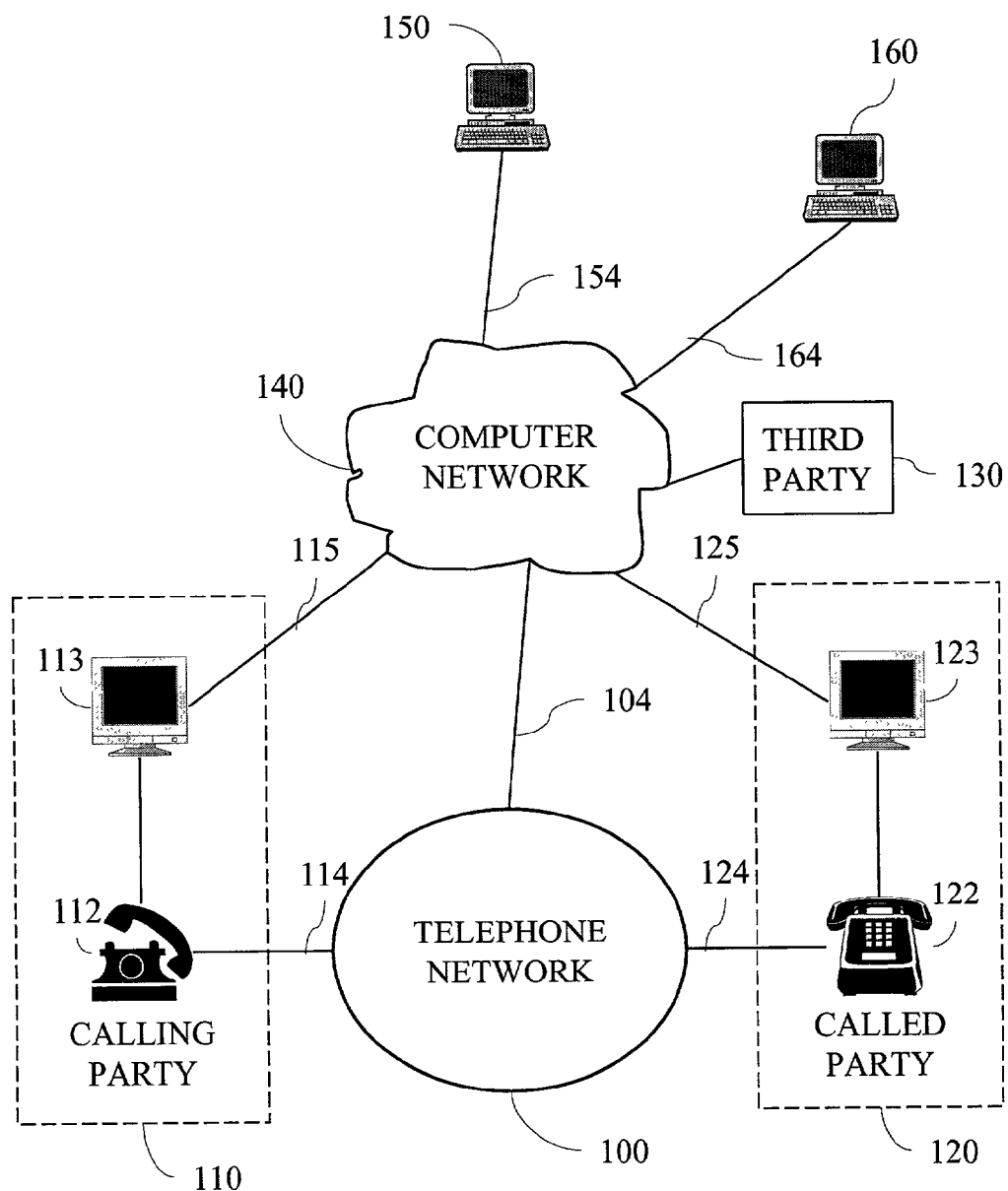
FIG. 1 is a schematic diagram showing generally an architecture of computer and telephone networks used to implement the present invention.

FIG. 1 is a schematic diagram showing generally an architecture of the computer and telephone networks used to implement the present invention. Telephone network 100 can be a wireline network. For example, telephone network 100 may be operated by a local telephone exchange carrier. Specifically, telephone network 100 can be, for example, an Advanced Intelligent Network (AIN).

Calling party 110 can use equipment 112 on telephone line 114 to communicate with called party 120, who has equipment 122 that is in communication with telephone network 100 via telephone line 124. Similarly, called party 120 can initiate a communication session using equipment 122 with calling party 110. Equipment 112 and 122 can be regular telephone sets, video telephone sets, or computer systems adapted to facilitate voice communication on telephone lines.

Although telephone network 100 is depicted and described herein as a wireline telephone network, telephone network 100 can be a wireless telephone network or can comprise both wireline and wireless networks. For example, telephone network 100 can be a wireless intelligent network. Accordingly, one or both of telephone lines 114 and 124 can be wireless connections, and equipment 112 and 122 can be wireless devices with wireless communication capabilities.

Display device 113 is associated with equipment 112. Display device 113 and equipment 112 may be an integrated unit. Display device 113 can be adapted to communicate with source computer 150 through telephone line 114, telephone network 100, communication link 104, computer network 140, and link 154. For example, an application software can be installed to receive information from telephone network 100 to initiate a data communication with computer network 140. Alternatively, display device 113 can be adapted to communicate more directly with source computer 150 through connection 115 and computer network 140, bypassing telephone network 100. In the latter case, display device 113 is associated with a modem and a software application (both not shown) that can facilitate data communications sessions between display device 113 and source computer 150.

Similarly, display device 123 is associated with equipment 122. Display device 123 and equipment 122 can be an integrated unit. Display device 123 can be adapted to communicate with source computer 150 through telephone line 124, telephone network 100, communication link 104, computer network 140, and link 154. Alternatively, display device 123 can be a monitor of a client computer (not shown) having a modem and an application software that is adapted to communicate more directly with source computer 150 through computer network 140 on connection 125, bypassing telephone network 100.

Source computer 160 is in communication with computer network 140 via link 164. It can be similarly accessible to display devices 113 and 123.

Telephone network 100 and computer network 140 can communicate with each other using communication link 104. For example, the communication between telephone network 100 and computer network 140 may use Transmission Control Protocol/Internet Protocol (TCP/IP). Alternatively, any suitable communications protocol used to facilitate communications between a telephone network and a computer network may be used to facilitate communications between telephone network 100 and computer network 140.

Although telephone lines 114 and 124 are depicted in FIG. 1 as part of the same telephone network, telephone lines 114 and 124 can be portions of two different telephone networks. Telephone lines 114 and 124 can be any suitable links that can facilitate voice and data communications The preferred link for an embodiment of the present invention is an integrated services digital network (ISDN) line. The ISDN line comprises a B-channel and a D-channel for voice and data communications, respectively.

Source computers 150 and 160 communicate with computer network 140 via connections 154 and 164, respectively. Connections or links 104, 154, 164, 115, and 125 can be one of several access lines to computer network 140, such as one or more of a dial-up connection, an ISDN line, a digital subscriber line (DSL), a T1 line, a T3 line, a cable modem line, or any other connection that can facilitate a communication session between computer network 140 and one of telephone network 100, source computer 150, source computer 160, display device 113, and display device 123, respectively. One or both source computers 150 and 160 can be associated with calling party 110, called party 120, or third party 130. Third party 130 may be, for example, any content provider who maintains at least one source computer with contents that are accessible via computer network 140.

In some embodiments, computer network 140 is the Internet. Source computers 150 and 160, and display devices 113 and 123 can be adapted to communicate using TCP/IP. Moreover, in addition to or in lieu of the plain old telephone service (POTS), equipment 112 and 122 can be adapted to communicate using Voice Over Internet Protocol (VoIP), in which case, telephone network 100 would be working in conjunction with a computer network.

In an embodiment in which both source computers 150 and 160 are both associated with a common party, source computer 150 can provide contents during a first time period, e.g., Monday to Friday, and source computer 160 can provide contents during a second time period, e.g., Saturday to Sunday. Similarly, source computers 150 and 160 may be used to provide contents to parties of the telephone call depending on the physical locations of the parties. Moreover, source computers 150 and 160 can be adapted to respond differently to different callers, for example, based on the geographic locations of the callers.

Using the overall system architecture depicted in FIG. 1 and described above, a number of embodiments can be implemented. In one embodiment, source computer 150 (and/or source computer 160) is associated with calling party 110 who supplies and updates contents of source computer 150. When a triggering event associated with telephone line 124 is detected, for example, when calling party 110 dials a telephone number assigned to telephone line 124 (the called number), two communication sessions are established. The first communication session is a voice session. The voice session is established between equipment 112 and equipment 122 via telephone network 100. The second communication session is a data session established between source computer 150 and display device 123. During the data session, contents from source computer 150 are transmitted for display on display device 123 via computer network 140.

In a second embodiment, source computer 150 (and/or source computer 160) can be associated with called party 120, third party 130, or calling party 110. Third party 130 may be, for example, the content provider of calling party 110's favorite online newspaper. In this embodiment, whenever calling party 110 uses equipment 112 to call any party (the triggering event), a data session between display device 113 and source computer 150 is established.

In a third embodiment, source computer 150 (and/or source computer 160) can be any source computer that is accessible via computer network 140. In this embodiment, both calling party 110 and caller party 120 can download or view the same contents from source computer 150. For example, after the voice session is established between calling party 110 and called party 120, two data sessions can be established when a triggering event is detected. The triggering event may occur, for example, when one or both parties enter one or more numbers or characters using a keypad during the voice session. The first data session enables calling party 110 to view contents of source computer 150 on display device 113. The second data session allows called party 120 to view, on display device 123, the same contents that are rendered on display device 113.

In each of the embodiments discussed above, the voice session may either be a POTS session or a VoIP session. The data session can be a TCP/IP session or other data session.

Figures 2A, 2B:
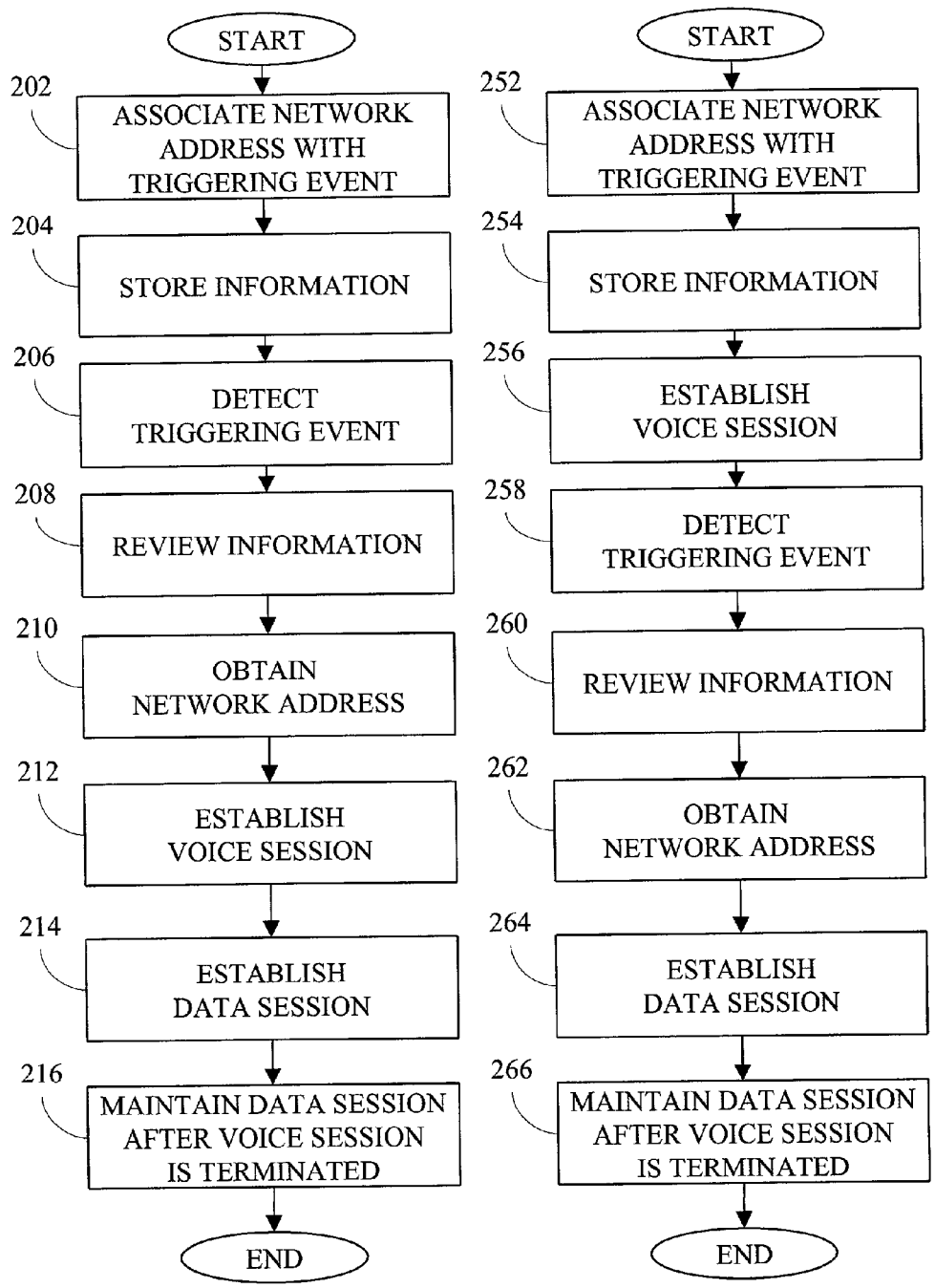
FIG. 2A is an exemplary flowchart illustrating typical steps that can be used in an embodiment of the present invention, in which a triggering event occurs before the voice session is established.
FIG. 2B is an exemplary flowchart illustrating typical steps that can be used in another embodiment, in which a triggering event occurs after the voice session is established.

FIG. 2A is an exemplary flowchart illustrating typical steps that can be used in an embodiment of the present invention, in which a triggering event occurs before the voice session is established.

In step 202, a network address of source computer 150 is associated with a triggering event of telephone network 100. The network address is a unique identifier of source computer 150 in computer network 140. Using the network address, source computer 150 can be located by other computers via computer network 140. In a specific implementation of the present invention in which TCP/IP is used, the network address can be an IP address, a website associated with the IP address, or a uniform resource locator (URL) associated with the source computer.

The triggering event can be one of several events. A triggering event can occur when a telephone set or telephone line receives a call. Another triggering event may occur when a user dials a telephone number. In the context of an AIN, the triggering event can be detected by a trigger provisioned at a service switching point (SSP). The AIN architecture is described in U.S. Pat. Nos. 5,701,301, and 5,838,774, which are incorporated herein by reference in their entirety.

In step 204, the relationship between the triggering event and the network address is stored in a database accessible to telephone network 100. The relationship may be, for example, stored in the database as a look up table. Preferably, however, the relationship is stored in the memory of one or more of equipment 112 and equipment 122.

Detection of the triggering event in step 206 can occur in one of several ways. For example, a first detection can occur when calling party 110 dials the telephone number of called party 120. A different triggering event may be detected after calling party 110 has completed dialing any telephone number of any called party. In a specific example in which called party 120 is equipped with a Caller ID device, the triggering event can be detected when the Caller ID device successfully obtains or collects the calling party's telephone number.

In step 208, after the triggering event is detected, the information stored in step 204 is reviewed.

In step 210, the network address of source computer 150 is obtained.

In step 212, a voice session between calling party 110 and called party 120 is established. During the voice session, calling party 110 and called party 120 can communicate, by voice, through equipment 112 and 122 on telephone lines 114 and 124, respectively.

In step 214, a data session via computer network 140 is established between display device 113 and source computer 150. Contents of source computer 150 can be displayed on display device 113 during the data session. In this step, an application software installed on equipment 122 establishes the data session.

In step 216, the data session can preferably be maintained even after the voice session is terminated. Alternatively, the data session could be terminated when the voice session is terminated.

FIG. 2B is an exemplary flowchart illustrating typical steps that can be used in another embodiment, in which a triggering event occurs after the voice session is established. For example, one or both parties to the telephone call can press one or more buttons on a keypad after a voice session has been established to provide the triggering event.

Steps 252 and 254 are similar to corresponding steps 202 and 204 of FIG. 2A, respectively. In addition, one or more numbers and characters explained in step 258 below are associated with the network address are stored. As in step 204, the information is preferably stored on the memory equipment 112 and equipment 122.

In step 256, a voice session is established between calling party 110 and called party 120 after calling party 110 dials the telephone number of called party 120.

In step 258, if one or both of calling party 110 and called party 120 wish to view content from source computer 150, the parties can key in one or more numbers and characters using their keypads. The entry of the one or more numbers and characters, previously associated with the network address in step 252, comprise the triggering event in this embodiment. The one or more numbers and characters may be, for example, a string comprising "* 1 2 3 4 #".

Steps 260, 262, 264, and 266 of FIG. 2B are similar to corresponding steps 208, 210, 214, and 216 of FIG. 2A, respectively.

Figure 3:
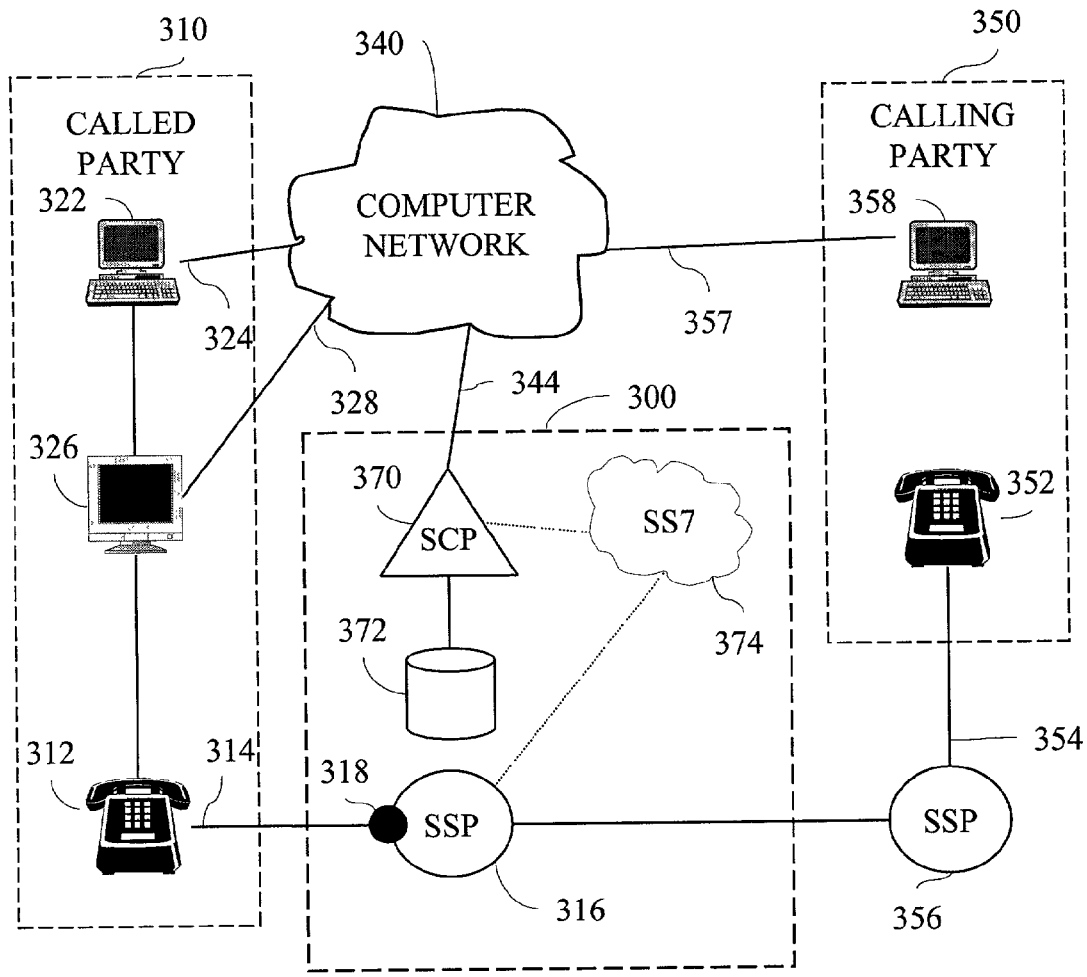
FIG. 3 is a schematic diagram showing a system architecture of the present invention, in which a called party is a subscriber of the present invention and in which contents of a source computer associated with a calling party's telephone number are displayed for the called party.

FIG. 3 is a schematic diagram showing a system architecture of the present invention implemented in telephone network 300, in which a called party is a subscriber of a service provided according to the present invention. Although telephone network 300 is depicted in FIG. 3 and described herein as an AIN, one of ordinary skill in the art can implement the present invention in other telephone networks using the teaching of this disclosure.

AIN 300 is a service provider of the present invention. Called party 310 is a customer of AIN 300 and a service subscriber of the present invention. Called party 310 has customer premises equipment (CPE) 312. CPE 312 may be, for example, a telephone set. Called party 310 may use CPE 312 to effect communication sessions (i.e., initiate and receive calls) through telephone line 314.

The telephone number associated with telephone line 314 is hereinafter referred to as the subscriber number or the called number. Telephone line 314 is connected to service switching point (SSP) 316. Telephone line 314 can be one of several types of lines, including POTS, DSL, ISDN, etc. For example, telephone line 314 maybe an ISDN line.

Calling party 350 is a customer of a telephone network. Calling party 350 has CPE 352 and source computer 358. CPE 352 may be connected to AIN 300 via, for example, SSP 356 on telephone line 354. Calling party 350 has some level of control over source computer 358. For example, calling party 350 can supply contents to source computer 358. Source computer 358 is connected to computer network 340 via link 357. Source computer 358 and CPE 352 need not be co-located. In fact, source computer 358 and CPE 352 can be thousands of miles apart from each other.

For purposes of illustration, SSP 356 is shown as being outside AIN 300. However, SSP 356 may be an SSP on AIN 300, and may even be SSP 316. Similarly, for illustration purposes, calling party 350 is shown to be a customer of a wireline network. Calling party 350 can be, however, a customer of a wireless network, in which case CPE 352 would be a wireless device and SSP 356 would be a mobile switching center (MSC). The wireless device may be a Wireless Application Protocol (WAP) enabled wireless device.

WAP is an application environment and set of communication protocols for wireless devices designed to enable manufacturer-, vendor-, and technology-independent access to computer network 340 and advanced wireless telephony services provided by a wireless communication network. An example of computer network 140 is the Internet. WAP provides wireless Internet access to wireless devices from the Internet through digital cellular networks, giving network users a menu driven method for downloading information, such as flight schedules and bank account balances.

Trigger 318 is provisioned on SSP 316 to detect incoming calls intended for telephone line 314. Trigger 318 may be, for example, a termination attempt trigger. Trigger 318 may also be a terminating busy/no answer trigger. Trigger 318 detects incoming calls intended for telephone line 314 of called party 310. For example, when calling party 350 uses CPE 352 associated with telephone line 354 to dial the subscriber number, trigger 318 detects the call. Trigger 318 can also detect calls from other callers who dial the subscriber number. Preferably, trigger 318 is associated with a Caller ID service in which SSP 316 can obtain the calling party's telephone number, e.g., the telephone number of telephone line 354.

CPE 312 may be a video telephone set having an integrated display device 326, a modem, and an application software having capabilities to access computer network 340. Alternatively, CPE 312 may be associated or in communication with target computer 322 (having the same application software and modem) of which display device 326 is a component.

The detection of an incoming call by trigger 318 causes SSP 316 to launch a query. The query launched by SSP 316 is sent to service control point (SCP) 370 over the AIN's signaling network 374. In one embodiment, signaling network 374 uses common channel signaling system number 7 (SS7) as shown in FIG. 3. The query comprises the subscriber number in a Called_Party_ID field of the query. In addition, the query can comprise the telephone number of telephone line 354 in a Calling_Party_ID field of the query.

SCP 370 uses the subscriber number to access a subscriber list associated with called party 310. The subscriber list may be retrieved from database 372. The subscriber list can comprise network addresses of source computer 328 associated with calling party 350.

Using the subscriber number, SCP 370 can also retrieve call processing instructions from database 372. The call processing instructions are instructions from SCP 370 to SSP 316 regarding how calls received by SSP 316 should be handled. One or more of the instructions can be provided by SCP 370 to SSP 316 in the form of a response to the query. In other embodiments, the subscriber list can be stored on a memory of equipment 312 or target computer 322, or both.

Display device 326 is associated with called party 310. Display device 326 can be an integral part of CPE 312. For example, CPE 312 may be a video telephone set with capabilities to access computer network 340 directly via link 328. Alternatively, display device 326 may be a monitor of target computer 322, which is connected to computer network 340 via link 324. In any event, display device 326 and CPE 312 are co-located such that called party 310 has access to both of them at the same time. Display device 326 can receive contents from source computer 358 through computer network 340 via link 357 and one of links 324 and 328.

Links 324, 328, and 357 can be one of several suitable communication links. For example, each of links 324, 328, and 357 can be one or more of a dial-up connection, an ISDN line, a DSL, a T1 line, a T3 line, a cable modem line, or any other connection that can facilitate a communication session via computer network 340.

Although not shown in FIG. 3, it is understood that AIN 300 can include other AIN elements. For example, services nodes, intelligent peripherals, and other AIN elements may be used in connection with SCP 370 and SSP 316 to implement the present invention.

In other embodiments, SCP 370 can be adapted to communicate with computer network 340. In these embodiments, contents from source computer 358 can be displayed on display device 326 via link 344 and telephone line 314 instead of using one of links 324 and 328.

Figure 4:
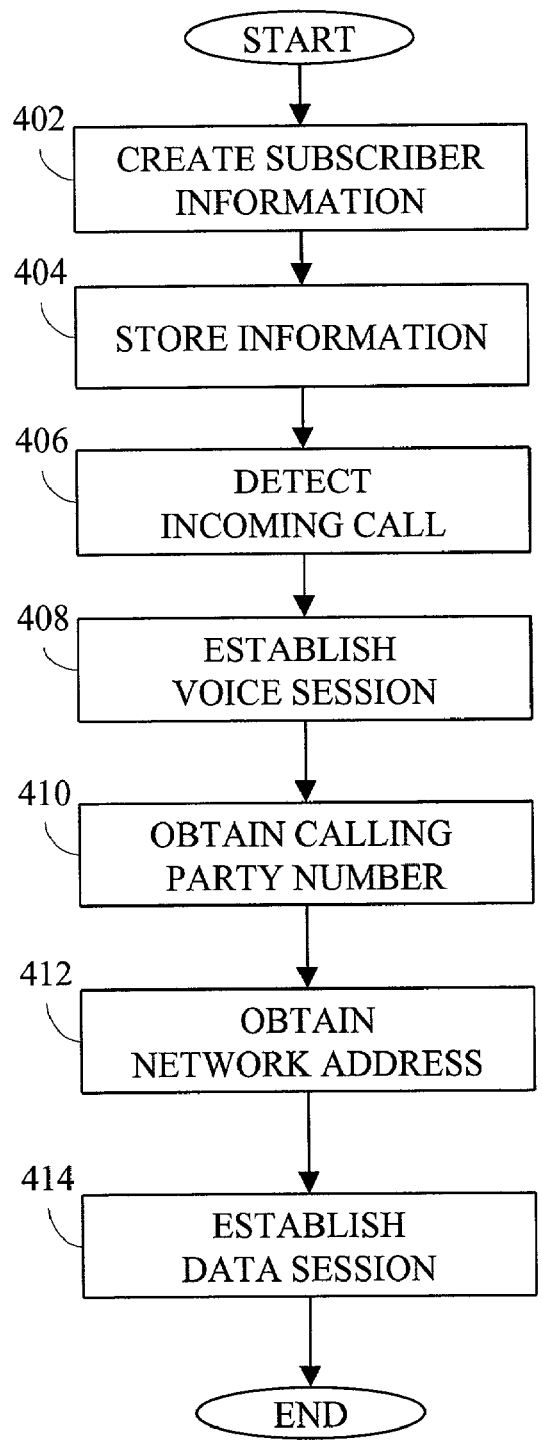
FIG. 4 is an exemplary flowchart illustrating steps that can be used to implement the embodiment shown in FIG. 3.

FIG. 4 is an exemplary flowchart illustrating steps that can be used to implement the embodiment shown in FIG. 3.

In step 402, subscriber information is created. The subscriber information may comprise, for example, one or more associations or relationships between network addresses of source computers and calling party's telephone numbers. Other identifiers, for example, uniform resource locators (URL), may be used as network addresses. For illustration purposes, assume that the network address of source computer 358 is "358.35.58.358" and the telephone number for telephone line 354 is "354-354-3554."

In step 404, the subscriber information is stored in a location retrievable by CPE 312 and target computer 322. For example, the subscriber information created in step 404 may be stored in a memory of CPE 312 and target computer 322. The subscriber information can also be stored in a database, for example, database 372, that is accessible to SCP 370. Preferably, the subscriber information can be stored in a subscriber list or a table, such as, for example, Table 1 below (using the exemplary addresses and telephone numbers).

TABLE 1

| Calling Party Number | Network Address |
|---|---|
| 354-354-3554 | 358.35.58.358 |

Alternatively, the relationship may be one that is shown in Table 2 below:

TABLE 2

| Calling Party Number | Network Address |
|---|---|
| 354-354-3554 | www.callingparty.com |

Other relationships are possible. For example, calls from specific groups (e.g., government agencies, commercial enterprises, academic institutions, consumers) may respectively be assigned different network addresses.

In step 406, when calling party 350 finishes dialing the telephone number associated with telephone line 314, the call is detected. Detection of the call may be accomplished, for example, by trigger 318 provisional on SSP 316. Of course, CPE 312 and target computer 322 can alternatively be adapted to detect the incoming call without relying on trigger 318.

In step 408, a voice session is established between calling party 350 and called party 310. The voice session may be established, for example, by SSP 316 based on an Authorize-_Termination response received from SCP 370. During the voice session, calling party 350 and called party 310 can communicate with each other using CPE 352 and CPE 312, respectively.

In step 410, calling party 350's telephone number is obtained. The calling party's number may be collected using known technologies. For example, a Caller ID service may be used to collect the calling party's number.

In step 412, the network address associated with the calling party's number is obtained. This can be accomplished by reviewing the subscriber information. For example, one of Tables 1 and 2 can be reviewed to obtained the network address.

In step 414, a data session is established between display device 326 and source computer 358. The data session may be established using any known method. For example, a software application of CPE 312 or target computer 322 can launch browser to display the contents of source computer 358. During the data session, called party 310 can view, on display device 326, contents provided by source computer 358 via computer network 340 and one of links 324 and 328.

Figure 5:
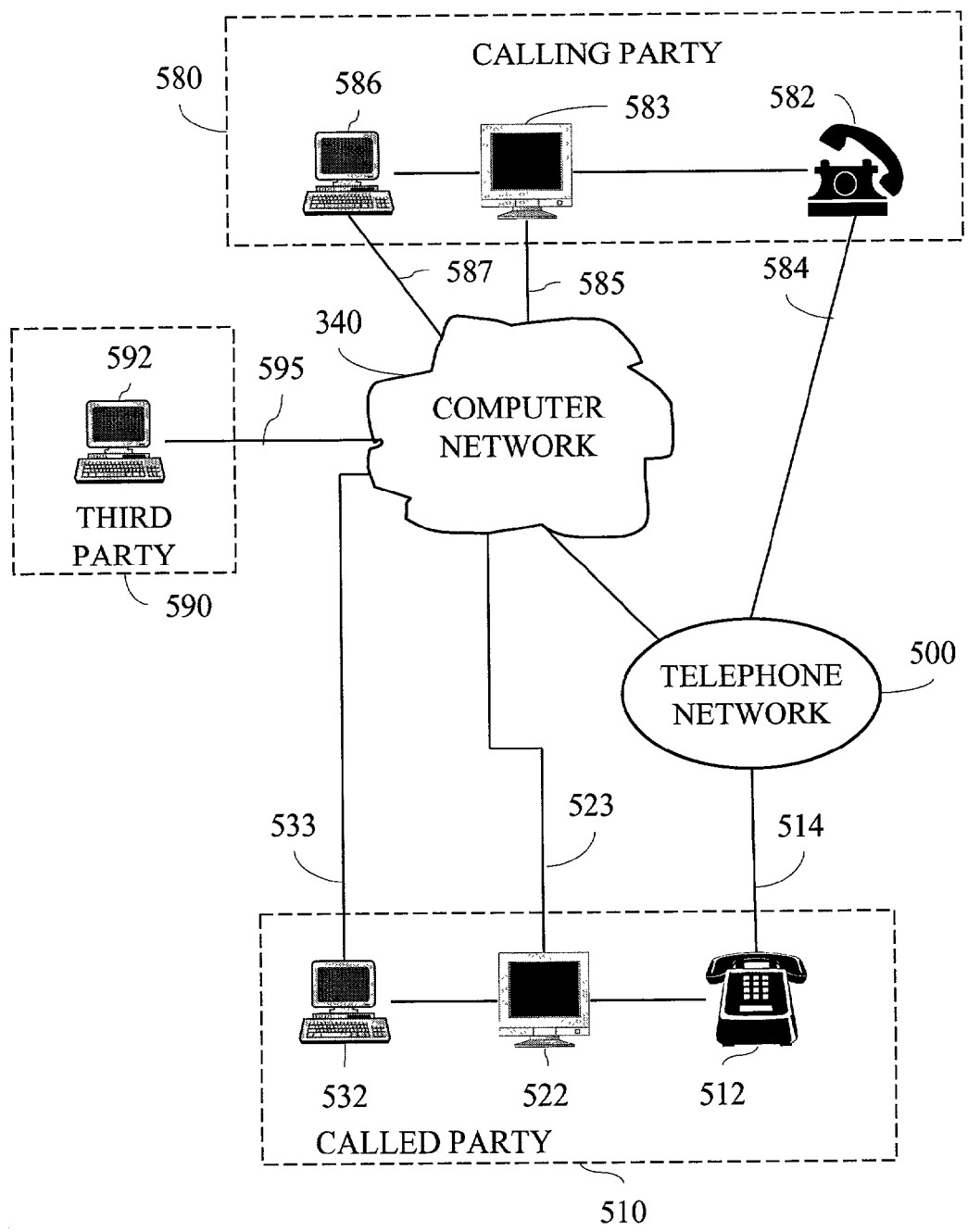
FIG. 5 is a schematic diagram showing another system architecture of the present invention, in which a calling party is a subscriber of the present invention and in which contents of a source computer associated with a called party or a third party are displayed for the calling party.

FIG. 5 is a schematic diagram showing another system architecture, in which a calling party is a subscriber of the present invention. Telephone network 500 may be an AIN or other wireline or wireless telephone networks.

Calling party 580 is a customer of telephone network 500 and a service subscriber of the present invention. Telephone line 584 connects CPE 582 of calling party 580 to telephone network 500. Calling party 580 may use CPE 582 to effect communication sessions (i.e., initiate and receive calls) through telephone line 584 with called party 510 via telephone line 514 (on equipment 512). Telephone line 514 is connected to telephone network 500.

In addition to CPE 582, calling party 580 also has display device 583. Display device 583 can be an integral part of CPE 582, for example, CPE 582 may be a video telephone set with a video screen. Display device 583 may also be a monitor of a computer system connected to CPE 582. For example, display device 583 may be the monitor of target computer 586, which is in communication with CPE 582. Display device 583 and CPE 582 are located in a common place where calling party 580 has access to both of them. Display device 583 can communicate with computer network 340 via link 585, and if through target computer 586, via link 587. In either case, a modem (not shown) can be used to access computer network 340 via one of links 585 and 587.

Third party 590 has source computer 592 that is connected to computer network 340 via link 595. Third party 590, for the purposes of illustrating this embodiment of the present invention, can be an operator of a favorite web site of calling party 580. Source computer 592 can deliver contents to display device 583 via computer network 340.

Links 585, 587, and 595 can be one of several suitable communication links. For example, each of links 585, 587, and 595 can be one or more of a dial-up connection, an ISDN line, a DSL, a T1 line, a T3 line, a cable modem line, or any other connection that can facilitate a communication session via computer network 340.

Called party 510 has CPE 512 that is connected to telephone network 500 by telephone line 514. Called party 510 also has display device 522 and target computer 532, which are connected to computer network 340 by links 523 and 533, respectively. Display device 522 can be a component of CPE 512 or target computer 532. In addition, CPE 512 and target computer 532 may be connected or linked to each other for communication purposes.

Figure 6:
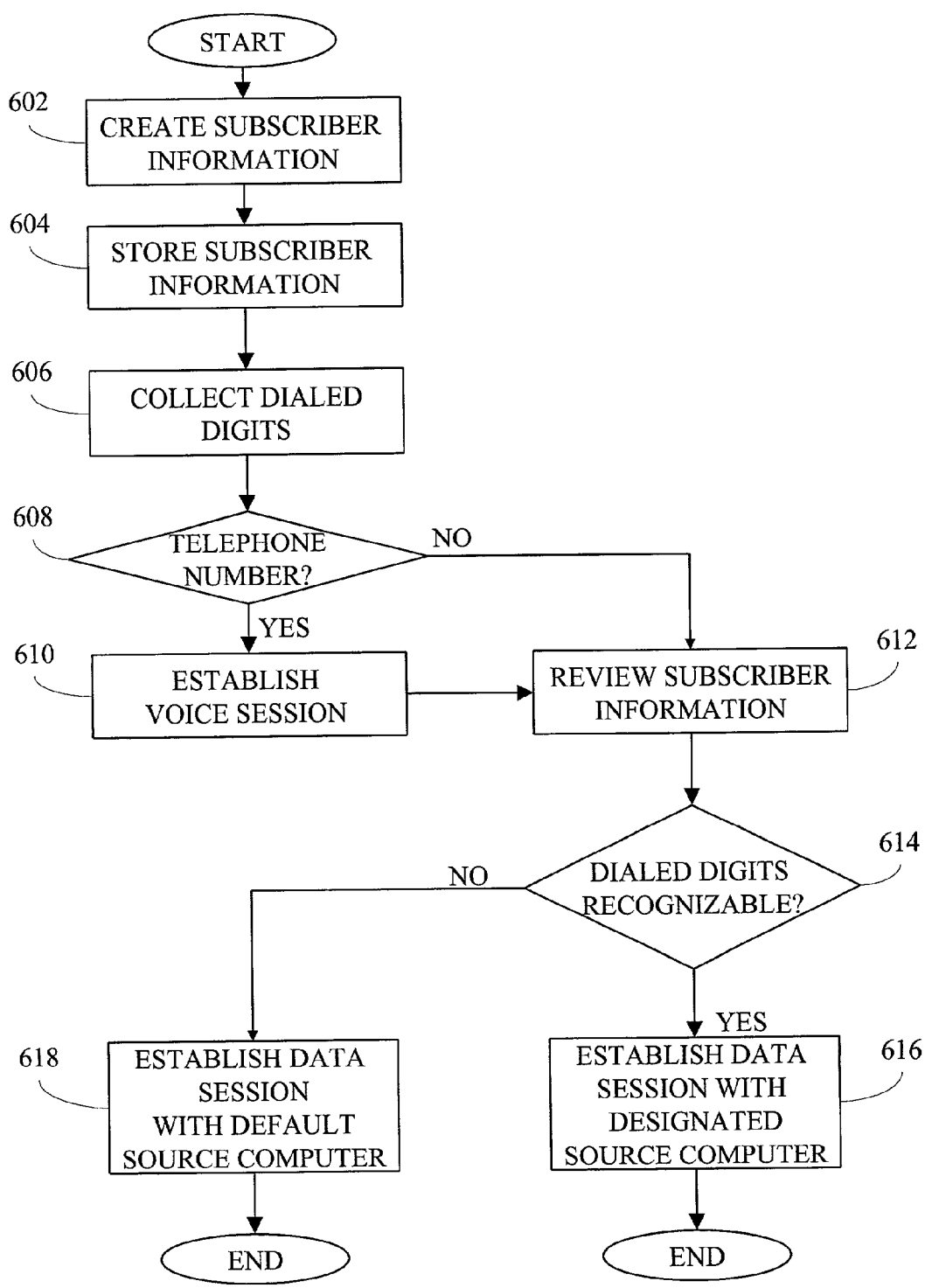
FIG. 6 is an exemplary flowchart illustrating steps that can be used to implement the embodiment shown in FIG. 5.

FIG. 6 is an exemplary flowchart illustrating steps that can be used to implement the embodiment shown in FIG. 5.

Step 602 is similar to step 402 described above. For illustration purposes, assume that the subscriber information in step 602 comprises network addresses of source computers 592 and 532, which, for illustration purposes, are "59.592.59.592" and "53.532.53.532", respectively. The telephone numbers for telephone lines 514 and 595 are, for illustration purposes, "514-514-5114" and "595-595-5995", respectively.

In step 604, the subscriber information is stored in a database. The database is accessible to CPE 582 and target computer 586. For example, the subscriber information may be stored in a memory of CPE 582 and target computer 586. Preferably, the subscriber information can be stored in the form of a subscriber list or a table, such as, for example, Table 3 below.

TABLE 3

| Dialed Number | Network Address |
| --- | --- |
| 514-514-5114 | 53.532.53.532 |
| Other numbers | 59.592.59.592 |

The subscriber information can be organized and stored in a different manner. For example, calling party 580 can designate different network addresses of multiple source computers depending on difference circumstances. For example, calling party 580 can associate different network addresses with different dialed digits prefixed or suffixed to a string of telephone numbers. For example, Table 4 below can be used to associate multiple network addresses of different source computers with different dialed strings. It is noted that Table 4 contains exemplary dialed strings and network addresses.

TABLE 4

| Dialed String | Network Address |
| --- | --- |
| *411-NPA-NXX-XXXX | www.localpaper.com |
| NPA-NXX-XXXX-#543 | www.weather.com |
| #622-NPA-NXX-XXXX | www.trafficalert.org |

In Table 4 above, NPA-NXX-XXXX represents a string of telephone numbers. The NPA-NXX-XXXX string can be any number of digits as implemented in a specific network. In the United States, for example, the string can comprise seven or 10 digits.

Each of the network addresses shown in Table 4 is associated with a source computer. For example, www.localpaper.com can be associated with a newspaper's web site on the Internet. Similarly, instantaneous weather and traffic conditions can be obtained from www.weather.com and www.trafficalert.org, respectively. In a specific example, when the prefix "*411" is dialed preceding any telephone number, network address "www.localpaper.com" would be retrieved in step 612 below.

In step 606, after calling party 580 completes dialing a string of numbers, the dialed string is collected.

In step 608, CPE 582 or target computer 586 determines whether the dialed string comprises a valid telephone number. If so, the process goes to step 610 in which a voice session is established between calling party 580 and a called party associated with the telephone number dialed. For example, if the telephone number of telephone line 514 was part of the dialed string input by calling party 580, a voice session is established in step 610 between calling party 580 and called party 510. On the other hand, if the dialed string does not contain a valid telephone number, the process goes to step 612, by passing step 610, in which case no voice session is established.

In step 612, CPE 582 or target computer 586 reviews the subscriber information. For example, it may retrieve one of Table 3 and Table 4 to obtain a network address that is associated with the dialed digits.

In step 614, it is determined whether the dialed digits are associated with a designated network address. If so, the process goes to step 616. Otherwise, the process continues in step 618.

In step 616, a data session is established between display device 583 and a source computer associated with the dialed digits. In one specific example, if the dialed string was "*411-510-510-5110", a source computer associated with www.localpaper.com would be contacted and contents of that source computer would be displayed on display device 583 during a data session. In a voice session was established in step 610, the data session and voice session take place concurrently. Alternatively, if the dialed string "510-510-5110#543" then a source computer associated with a weather service having the network address of www.weather.com would be contacted and weather information from that source computer would be displayed on display device 583 during the data session.

In step 618, a data session is established between a default source computer and display device 583. The default source computer may be, for example, source computer 592. In practice, any source computer accessible via computer network 340 may be designated as the default source computer.

Figure 7:
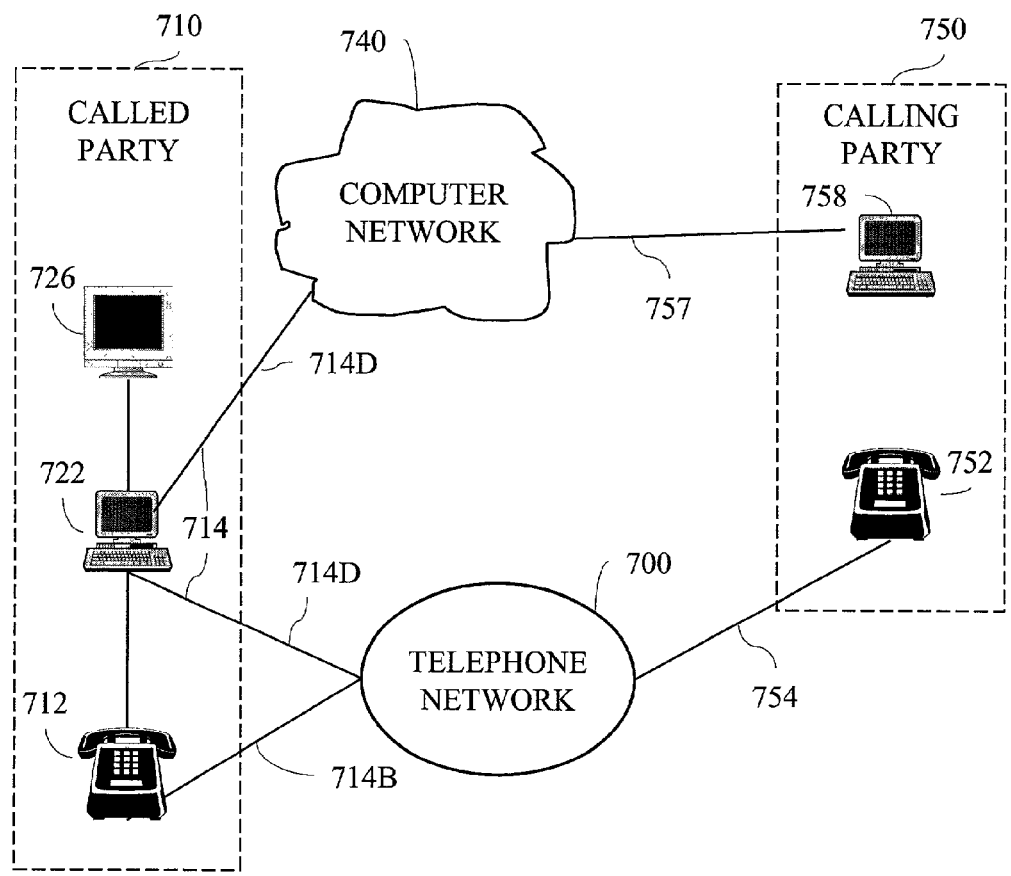
FIG. 7 is a schematic diagram showing a preferred embodiment of the present invention, in which an ISDN line is utilized by a called party for voice and data communications.

FIG. 7 is a schematic diagram showing a preferred embodiment of the present invention, in which an ISDN line is utilized by a called party for voice and data communications. Telephone network 700 is a service provider of the present invention. Called party 710 is a customer of telephone network 700 and a service subscriber of the present invention. Called party 710 has CPE 712. CPE 712 may be, for example, a telephone set. Called party 710 may use CPE 712 to effect communication sessions (i.e., initiate and receive calls) through line 714. Line 714 is an ISDN line. Line 714 has B-channel 714B and D-channel 714D.

The telephone number associated with line 714 is hereinafter referred to as the subscriber number or the called number. Line 714 is connected to service telephone network 700.

Calling party 750 has CPE 752 and source computer 758. CPE 752 may be connected to telephone network 700 on telephone line 754. Calling party 750 has some level of control over source computer 758. For example, calling party 750 can supply contents to source computer 758. Source computer 758 is connected to computer network 740 via link 757.

CPE 712 may be a video telephone set having an integrated display device 726 and capabilities to access computer network 740. Alternatively, CPE 712 may be associated or in communication with target computer 722 of which display device 726 is a component. Display device 726 can receive contents from source computer 758 through computer network 740 via link 757 and D-channel 714D. D-channel 714D can be adapted to access computer network 740 with or without telephone network 700.

Figure 8:
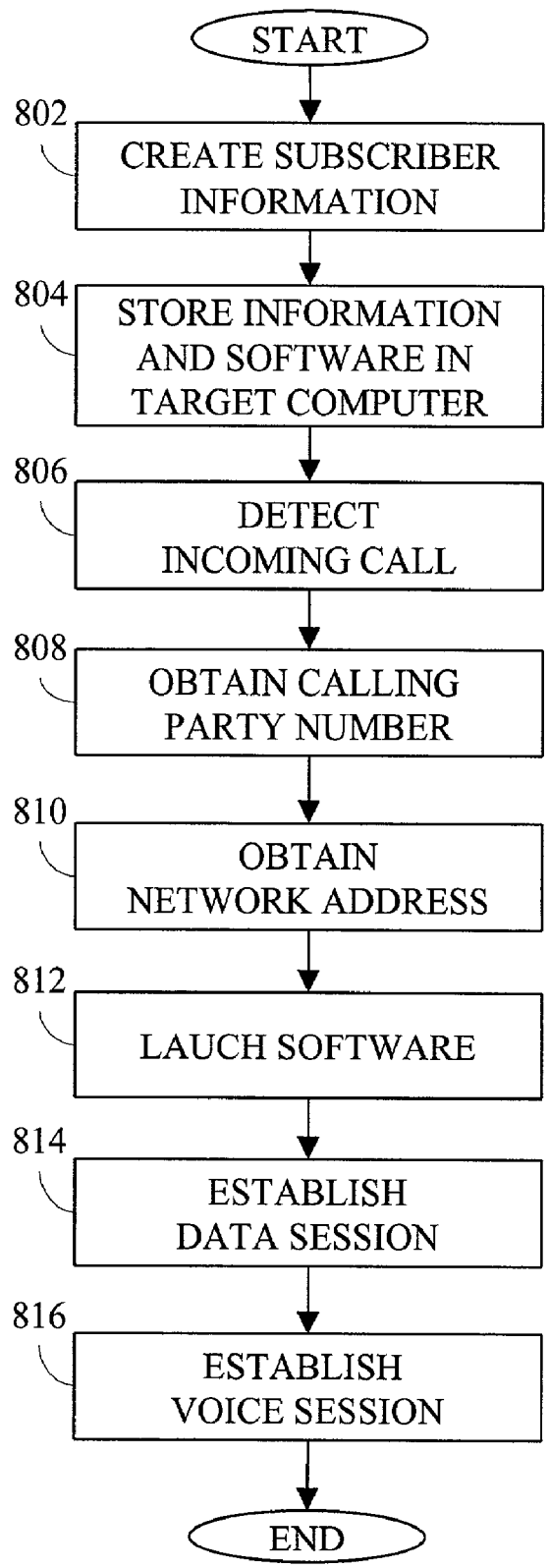
FIG. 8 is an exemplary flowchart illustrating steps that can be used to implement the embodiment shown in FIG. 7.

FIG. 8 is an exemplary flowchart illustrating steps that can be used to implement the embodiment shown in FIG. 7. In step 802, subscriber information is created. The subscriber information may comprise, for example, one or more associations or relationships between network addresses of source computers and calling party's telephone numbers. Other identifiers, for example, uniform resource locators (URL), may be used as network addresses. For illustration purposes, assume that the network address of source computer 758 is "758.75.58.758" and the telephone number for telephone line 754 is "754-754-7554."

In step 804, the subscriber information is stored in a location retrievable by CPE 712 and target computer 722. For example, the subscriber information created in step 804 may be stored in a memory of CPE 712 and target computer 722. Preferably, the subscriber information can be stored in a subscriber list or a table, such as, for example, Table 5 below (using the exemplary addresses and telephone numbers).

TABLE 5

| Calling Party Number | Network Address |
| --- | --- |
| 754-754-7554 | 758.75.58.758 |

Alternatively, the relationship may be one that is shown in Table 6 below:

TABLE 6

| Calling Party Number | Network Address |
| --- | --- |
| 754-754-7554 | www.buddy.name |

Other relationships are possible.

In step 806, when calling party 750 finishes dialing the telephone number associated with telephone line 714, the call is detected. CPE 712 and target computer 722 can be adapted to detect the incoming call.

In step 808, calling party 750's telephone number is obtained. The calling party's number may be collected using known technologies. For example, a Caller ID service may be used to collect the calling party's number.

In step 810, the network address associated with the calling party's number is obtained. This can be accomplished by reviewing the subscriber information. For example, one of Tables 5 and 6 can be reviewed to obtained the network number.

In step 812, an application software is launched by one of CPE 712 and target computer 722.

In step 814, a data session is established between display device 726 and source computer 758. The data session may be established using any known method. For example, the software application of CPE 712 or target computer 722 can establish the data session using the network address obtained in step 810. During the data session, called party 710 can view, on display device 726, contents provided by source computer 758 via computer network 740 and D-channel 714D.

In step 816, a voice session is established between calling party 750 and called party 710. During the voice session, calling party 750 and called party 710 can communicate with each other using CPE 752 and CPE 712, respectively.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A system for viewing contents of a source computer via a computer network, the system comprising:
    means for associating a calling party's telephone number with a group;
    means for associating the group to a network address of the source computer;
    means for storing a result of the associating;
    means for establishing a voice session between the calling party and a called party;
    means for receiving a dual-tone multi-frequency input after the voice session is established;
    in response to the dual-tone multi-frequency input,
        means for retrieving the network address from the memory that is associated with the calling party's telephone number,
        means for establishing a first data session between the calling party's device and the source computer, and
        means for establishing a second data session between a called party's device and the source computer;
    means for terminating the voice session; and
    means for maintaining the first data session and the second data session despite termination of the voice session.

2. The system of claim 1, further comprising means for associating multiple dialed numbers to multiple network addresses, with each dialed number mapping to a network address.

3. The system of claim 1, further comprising means for detecting the dual-tone multi-frequency input after the voice session is established.

4. The system of claim 1, further comprising means for associating the source computer a third party.

5. A method for enabling a party of a telephone call to view contents of a source computer via a computer network, comprising:
    associating a calling party's telephone number with a group;
    associating the group to a network address of the source computer;
    storing a result of the association;
    establishing a voice session between the calling party and a called party;
    collecting the calling party's telephone number from caller identification information;
    receiving a dual-tone multi-frequency input after the voice session is established;
    in response to the dual-tone multi-frequency input,
        retrieving the network address from the memory that is associated with the calling party's telephone number,
        establishing a first data session between the calling party's device and the source computer, and
        establishing a second data session between a called party's device and the source computer;
    terminating the voice session; and
    maintaining the first data session and the second data session despite termination of the voice session.

6. The method of claim 5, wherein the network address is an Internet Protocol address.

7. The method of claim 5, wherein the network address is a uniform resource locator.

8. The method of claim 5, wherein the result of the association is stored in a database.

9. The method of claim 5, further comprising associating multiple dialed numbers to multiple network addresses, with each dialed number mapping to a network address.

10. The method of claim 5, wherein the source computer is associated with an entity other than the calling party and the called party.

11. A system for enabling a user to view contents of a source computer via a computer network, the system comprising:
    means for associating a calling party's telephone number with a group;
    means for associating the group to a network address of the source computer;
    means for detecting an attempt to establish a voice session;
    means for obtaining a dialed communications address associated with the attempted voice session;
    means for establishing the voice session between the calling party and a called party;
    means for receiving a dual-tone multi-frequency input after the voice session is established;
    in response to the dual-tone multi-frequency input,
        means for retrieving the network address associated with the calling party's telephone number and with the dialed communications address,
        means for establishing a first data session between the calling party's device and the source computer,
        means for establishing a second data session between the called party's device and the source computer, and
        means for displaying contents of the source computer;
    means for terminating the voice session; and
    means for maintaining the first data session and the second data session despite termination of the voice session.

12. The system of claim 11, further comprising means for collecting the dialed communications address during the attempt.

13. The system of claim 11, further comprising means for collecting the calling party's communications address.

14. The system of claim 11, wherein the network address of the source computer is one of an Internet protocol address and a uniform resource locator.

15. The system of claim 11, wherein the source computer is associated with a third party unrelated to the voice session.

* * * * *